United States Patent
Choi et al.

(10) Patent No.: US 9,608,527 B1
(45) Date of Patent: Mar. 28, 2017

(54) OVERSHOOT PREVENTION FOR DEEP DIMMING STARTUP

(71) Applicant: Marvell International Ltd., Hamilton (BM)

(72) Inventors: Jinho Choi, Saratoga, CA (US); Hao Peng, Sunnyvale, CA (US); Biing Long Shu, Siglap (SG); Wanfeng Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 111 days.

(21) Appl. No.: 14/621,310

(22) Filed: Feb. 12, 2015

Related U.S. Application Data (60) Provisional application No. 61/939,408, filed on Feb. 13, 2014.

(51) Int. Cl.
*H02M 1/32* (2007.01)
*H02M 3/335* (2006.01)

(52) U.S. Cl.
CPC .............................. *H02M 3/33507* (2013.01)

(58) Field of Classification Search
CPC ...... H02M 1/32; H02M 1/4208; H02M 3/325; H02M 3/335; H02M 3/156; H02M 3/33507; H02M 3/33523; H02M 3/1582
USPC ....... 363/16, 21.12, 21.13, 21.15, 21.16, 50, 363/55, 78, 80
See application file for complete search history.

(56) References Cited

U.S. PATENT DOCUMENTS 5,764,495 A * 6/1998 Faulk ................ H02M 3/33507
323/303
5,768,118 A * 6/1998 Faulk ................ H02M 3/33576
323/288
(Continued)

FOREIGN PATENT DOCUMENTS

GB WO 2014179994 A1 * 11/2014 ......... H05B 33/0815
WO WO 00/51103 A1 8/2000
(Continued)

OTHER PUBLICATIONS

International Search Report and Written Opinion issued in International Application No. PCT/US2010/031446, mailed on Jul. 6, 2010.
(Continued)

*Primary Examiner* — Adolf Berhane (57) ABSTRACT

An apparatus includes an energy storage device, a driver circuit configured to receive energy from the energy storage device, and a bleed circuit configured to reduce an amount of the energy received by the driver circuit from the energy storage device. The bleed circuit is configured to reduce the amount of the energy received by the driver circuit during a startup period. The energy storage device may include a transformer, the driver circuit and bleed circuit being coupled to first and second windings of the transformer, respectively. A method includes receiving, by a driver circuit, energy from an energy storage device, and reducing, using a bleed circuit, the energy received by the driver circuit during a startup period. The energy storage device may include a transformer, the driver circuit and bleed circuit being coupled to first and second windings of the transformer, respectively.

17 Claims, 4 Drawing Sheets

(56) References Cited

U.S. PATENT DOCUMENTS

| | | | | |
|---|---|---|---|---|
| 5,841,641 A * | 11/1998 | Faulk | ............... | H02M 3/335 363/21.14 |
| 6,249,411 B1 * | 6/2001 | Hemena | ............... | H02J 1/108 361/18 |
| 6,272,025 B1 * | 8/2001 | Riggio | ............... | H01F 3/10 363/133 |
| 8,698,423 B2 * | 4/2014 | Zhang | ............... | H05B 37/02 315/185 R |
| 9,137,864 B2 * | 9/2015 | Sutardja | ............ | H05B 33/0815 |
| 9,203,295 B2 * | 12/2015 | Lee | ............... | H02M 1/126 |
| 9,214,851 B1 * | 12/2015 | Mao | ............... | H02M 1/08 |
| 9,392,654 B2 * | 7/2016 | Peng | ............... | H05B 33/0815 |
| 2002/0158590 A1 | 10/2002 | Saito et al. | | |
| 2010/0090607 A1 * | 4/2010 | Vos | ............... | H05B 33/0815 315/186 |

FOREIGN PATENT DOCUMENTS

| | | |
|---|---|---|
| WO | WO 2004/003869 A1 | 1/2004 |
| WO | WO 2006/135836 A1 | 12/2006 |

OTHER PUBLICATIONS

International Preliminary Report on Patentability and Written Opinion of the International Searching Authority issued Nov. 3, 2011 in International Application No. PCT/US2010/031446.

* cited by examiner

OVERSHOOT PREVENTION FOR DEEP DIMMING STARTUP

CROSS REFERENCE TO RELATED APPLICATION

This present disclosure claims the benefit of U.S. Provisional Application No. 61/939,408, filed on Feb. 13, 2014, which is incorporated by reference herein in its entirety.

BACKGROUND

A dimmer circuit produces an output signal with a variable voltage or a variable current. The dimmer circuit receives a control signal and controls the current or voltage of the output signal according to a value of the control signal. The dimmer circuit may be used to control a brightness of a light source, such as a Light Emitting Diode (LED).

The dimmer circuit may produce an output signal having a higher current or a higher voltage than called for by the value of the control signal. The higher current or higher voltage is called an overshoot. In a lighting system wherein the dimmer circuit controls an LED, the overshoot may produce a brief interval during which the light emitted by the LED is undesirably bright, such as by producing a flash of light.

SUMMARY

In an embodiment, an apparatus includes an energy storage device, a driver circuit configured to receive energy from the energy storage device, and a bleed circuit configured to reduce an amount of the energy received by the driver circuit from the energy storage device.

In an embodiment, the bleed circuit is configured to reduce the amount of the energy received by the driver circuit during a startup period.

In an embodiment, the driver circuit is configured to receive the energy from the storage device during a discharge interval, and the bleed circuit is configured to reduce the amount of the energy received by the driver circuit during the discharge interval.

In an embodiment, the energy storage device includes a transformer. The driver circuit is coupled to a primary winding of the transformer, and the bleed circuit is coupled to an auxiliary winding of the transformer.

In an embodiment, the apparatus is a dimming system.

In an embodiment, the apparatus is provided in an integrated circuit.

In an embodiment, a method includes receiving, by a driver circuit, energy from an energy storage device, and reducing, using a bleed circuit, the energy received by the driver circuit during a startup period.

In an embodiment, the energy storage device is a transformer. The driver circuit is coupled to a first winding of the transformer, and the bleed circuit is coupled to a second winding of the transformer.

DETAILED DESCRIPTION

Figure 1:
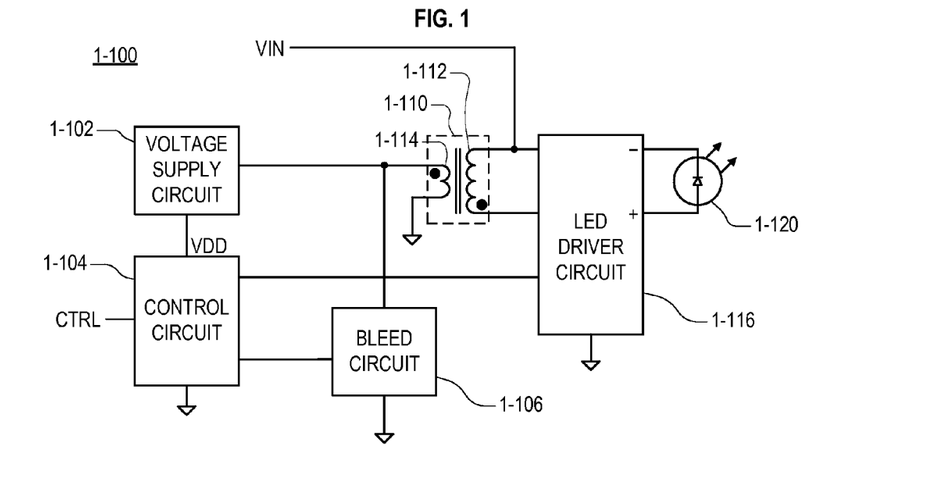
FIGS. 1 and 2 illustrate a dimmer system according to an embodiment.

FIG. 1 illustrates a dimmer system 1-100 according to an embodiment. The dimmer system 1-100 includes a voltage supply circuit 1-102, a control circuit 1-104, a bleed circuit 1-106, a Light Emitting Diode (LED) driver circuit 1-116, a transformer 1-110, and an LED 1-120.

The dimmer system 1-100 operates by periodically storing energy into the transformer 1-110 using a primary winding (or a first winding) 1-112 thereof, and then discharging the energy. The transformer 1-110 operates as an energy storage device. The control circuit 1-104 controls, using the LED driver circuit 1-116, the sequencing of storing the energy during charge intervals and discharging the energy during discharge intervals.

In an embodiment, the charge intervals and the discharge intervals are disjoint, that is, the energy is not simultaneously stored into and discharged from the transformer 1-110. In an embodiment, the control circuit 1-104, transformer 1-110, and LED driver circuit 1-116 form a Direct-Current-to-Direct-Current (DC-to-DC) converter such as a buck converter, a boost converter, a buck-boost converter, a boost-buck converter, a flyback converter, or the like.

A first portion of the energy stored in the transformer 1-110 may be discharged through the LED driver circuit 1-116 in order to provide a current to the LED 1-120. The control circuit 1-104 controls an output of the LED 1-120, that is, the control circuit 1-104 dims the LED 1-120, by controlling a magnitude of the first portion of the energy.

The control circuit 1-104 controls the magnitude of the first portion of the energy according to a value of a control signal CTRL. In an embodiment, the control signal CTRL may include an Inter-Integrated Circuit ($I^2C$) signal, a System Management Bus (SMBus) signal, a Pulse Width Modulated (PWM) signal, an analog signal, or the like.

Second and third portions of the energy may be discharged through the auxiliary winding (or a second winding) 1-114 of the transformer 1-110 into the voltage supply circuit 1-102 and the bleed circuit 1-106, respectively. The voltage supply circuit 1-102 uses the second portion of the energy to provide a supply voltage VDD to the control circuit 1-104.

The control circuit 1-104 controls the magnitude of the first portion of the energy discharged through the LED driver circuit 1-116 by one or more of controlling a magnitude of the energy stored in the primary winding 1-112 and controlling a magnitude of the third portion of the energy discharged through the auxiliary winding 1-114.

The control circuit 1-104 controls the bleed circuit 1-106 to control the magnitude of the third portion of the energy. The control circuit 1-104 decreases the magnitude of the first portion of the energy discharged through the LED driver circuit 1-116 by controlling the bleed circuit 1-106 to increase the magnitude of the third portion of the energy discharged into the bleed circuit 1-106. The magnitude of the third portion of the energy may be increased during a startup period to prevent an overshoot in the current supplied to the LED 1-120.

A person of skill in the art in light of the teachings and disclosures herein would recognize that the dimmer system 1-100 may include a variety of other circuits known to the art, such as one or more high voltage startup circuits, communication circuits, synchronization circuits, reference voltage circuits, clock circuits, protection circuits, and the like, which are omitted from the present application in the interest of brevity. A person of skill in the art in light of the teachings and disclosures herein would also understand that the dimmer system 1-100 could be employed to control a magnitude of a voltage or current delivered to a plurality of LEDs 1-120 or to devices other than an LED.

Figure 2:
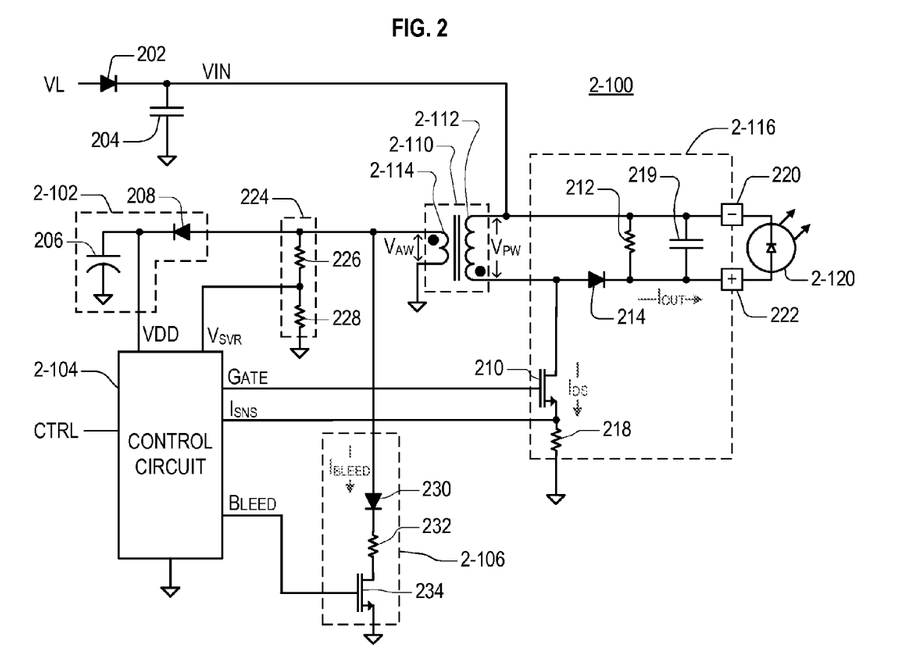

FIG. 2 illustrates a dimmer system 2-100 suitable for use as the dimmer system 1-100 according to an embodiment, showing additional details of the embodiment.

The dimmer system 2-100 receives a line voltage VL at an anode of a first diode 202. The line voltage VL may include an alternating current (AC) voltage, a pulsating direct current (DC) voltage, or a DC voltage. In an embodiment, a voltage value of the line voltage VL is a low voltage such as 1.5 volts. In another embodiment, the voltage value of the line voltage VL is a high voltage such as 120, 220, or 400 volts.

A cathode of the first diode 202 is connected to a first terminal of a first capacitor 204. A second terminal of first capacitor 204 is connected to ground. The first diode 202 and the first capacitor 204 produce an input voltage VIN by rectifying and filtering the line voltage VL. The first diode 202 also prevents a flow of current back from the dimmer system 2-100 into a source of the line voltage VL.

The input voltage VIN is supplied to a first terminal of a primary winding 2-112 of a transformer 2-110. The first terminal of the primary winding 2-112 and a second terminal of the primary winding 2-112 are connected to an LED driver circuit 2-116.

The LED driver circuit 2-116 is a buck-boost converter suitable for use as an embodiment of the LED driver circuit 1-116 of FIG. 1. The LED driver circuit 2-116 includes a second diode 214, a second capacitor 219, a load resistor 212, a driver n-channel Metal-Oxide-Semiconductor Field Effect Transistor (nMOSFET) 210, a current sense resistor 218, and positive and negative output terminals 222 and 220.

The first terminal of the primary winding 2-112 is connected to a first terminal of the load resistor 212, a first terminal of the second capacitor 219, and the negative output terminal 220. The second terminal of the primary winding 2-112 is connected to a drain of the driver re-channel nMOSFET 210 and to an anode of the second diode 214. A cathode of the second diode 214 is connected to a second terminal of the load resistor 212, a second terminal of the second capacitor 219, and a positive output terminal 222.

The second diode 214 and the second capacitor 219 are configured to receive energy discharged from the primary winding 2-112 and provide an output current $I_{OUT}$ to a load connected to the positive and negative output terminals 222 and 220. The output current $I_{OUT}$ has a positive voltage at the positive output terminal 222 relative to a voltage at the negative output terminal 220. The load resistor 212 operates to discharge energy stored in the second capacitor 219 when the output current $I_{OUT}$ is not flowing through to the positive and negative output terminals 222 and 220.

A source of the driver nMOSFET 210 is connected to a current sense signal $I_{SNS}$ and a first terminal of the current sense resistor 218. A second terminal of the current sense resistor 218 is connected to the ground. A voltage value of the current sense signal $I_{SNS}$ is proportional to a current flowing through the primary winding 2-112 and the driver nMOSFET 210.

A gate of the driver nMOSFET 210 is connected to a gate signal GATE. The driver nMOSFET 210 turns on when the gate signal GATE has a first value (i.e. an on value), and turns off when the gate signal GATE has a second value (i.e. an off value).

An anode of an LED 2-120 is connected to the positive output terminal 222, and a cathode of the LED 2-120 is connected to the negative output terminal 220. The LED 2-120 operates as the load of the LED driver circuit 2-116.

A control circuit 2-104 receives the current sense signal $I_{SNS}$ and a control signal CTRL, and produces the gate signal GATE according to values of the current sense signal $I_{SNS}$ and the control signal CTRL. The control circuit 2-104 is configured to control the magnitude of the energy stored in the transformer 2-110 by generating the gate signal GATE having a sequence of on values and off values. In an embodiment, the control circuit 2-104 is configured to control the magnitude of the energy stored in the transformer 2-110 by one or more of controlling respective durations of a plurality of on values of the gate signal GATE and controlling respective intervals between consecutive on values of the gate signal GATE; that is, by one or more of Pulse Width Modulation (PWM) and Pulse Frequency Modulation (PFM).

A person of skill in the art in light of the teachings and disclosures herein would understand how to configure the control circuit 2-104 to control the output current $I_{OUT}$ by one or more of PWM and PFM of the gate signal GATE according to values of the control signal CTRL and the current sense signal $I_{SNS}$, and therefore a description thereof is omitted from the present application in the interest of brevity. In an embodiment, the control circuit 2-104 includes a microcontroller or microprocessor that executes operations of the dimmer system 2-100 by executing computer programming instructions stored in a non-transient computer readable memory.

A first terminal of an auxiliary winding 2-114 of the transformer 2-110 is connected to a voltage supply circuit 2-102, a voltage divider 224, and a bleed circuit 2-106. A second terminal of the auxiliary winding 2-114 is connected to the ground. The auxiliary winding 2-114 is configured to discharge energy stored into the transformer 2-110 into the voltage supply circuit 2-102 and the bleed circuit 2-106 as will be described below.

The voltage supply circuit 2-102 includes a third diode 208 and a third capacitor 206. An anode of the third diode 208 is connected to the first terminal of the auxiliary winding 2-114 of the transformer 2-110. A cathode the third diode 208 is connected to a first terminal of the third capacitor 206 and to an output of the voltage supply circuit 2-102 that provides a supply voltage VDD. A second terminal of the third capacitor 206 is connected to the ground.

A current flows through the third diode 208 and into the third capacitor 206 when a voltage value of the first terminal of the auxiliary winding 2-114 is greater than a voltage value of the first terminal of the third capacitor 206. The current flowing into the third capacitor 206 increases the voltage value of the first terminal of the third capacitor 206. Current flowing out of the third capacitor 206 through the output that provides the supply voltage VDD reduces the voltage value of the first terminal of the third capacitor 206.

The voltage divider 224 includes an upper resistor 226 and a lower resistor 228. A first terminal of the upper resistor 226 is connected to the first terminal of the auxiliary winding 2-114. A second terminal of the upper resistor 226 is connected to an auxiliary voltage signal $V_{SVR}$ and to a first terminal of the lower resistor 228. A second terminal of the lower resistor 228 is connected to the ground.

The voltage divider 224 provides the auxiliary voltage signal $V_{SVR}$ having a voltage value according to an auxiliary winding voltage $V_{AW}$ of the auxiliary winding 2-114 and respective resistance values $R_U$ and $R_L$ of the upper and lower resistor 226 and 228, according to Equation 1, below:

$$V_{SVR} = V_{AW} \cdot \frac{R_L}{R_U + R_L}. \quad \text{(Equation 1)}$$

In an embodiment, the control circuit 2-104 senses the auxiliary winding voltage $V_{AW}$ using the auxiliary voltage signal $V_{SVR}$.

The bleed circuit 2-106 is connected to the first terminal of the auxiliary winding 2-114 of the transformer 2-110, and includes a bleed diode 230, a bleed resistor 232, and a bleed nMOSFET 234.

The bleed diode 230 operates to prevent a backward flow of a bleed current $I_{BLEED}$ from the bleed circuit 2-106 to the first terminal of the auxiliary winding 2-114. An anode of the bleed diode 230 is connected to the first terminal of an auxiliary winding 2-114. A cathode of the bleed diode 230 is connected to a first terminal of the bleed resistor 232.

The bleed resistor 232 operates to determine a magnitude of a flow of the bleed current $I_{BLEED}$ from the first terminal of the auxiliary winding 2-114 to the bleed circuit 2-106. A second terminal of the bleed resistor 232 is connected to a drain of the bleed nMOSFET 234.

A resistance value of the bleed resistor 232 is determined according to one or more of an amount of energy bled from the transformer 2-110 during a bleed operation, a magnitude of the supply voltage VDD, and a duration of the bleed operation $T_{BLEED}$.

The bleed nMOSFET 234 is configured to control the bleed operation by turning on and off according to a value of the bleed signal BLEED. The bleed operation occurs when the bleed nMOSFET 234 is on and the energy is stored in the transformer 2-110.

A source of the bleed nMOSFET 234 is connected to ground. A gate of the bleed nMOSFET 234 receives the bleed signal BLEED. When the bleed signal BLEED has a first value (i.e., an on value), the bleed nMOSFET 234 is on, and when the bleed signal BLEED has a second value (i.e., an off value), the bleed nMOSFET 234 is off.

The bleed signal BLEED is generated by the control circuit 2-104. The control circuit 2-104 is configured to control an overshoot of the output current $I_{OUT}$ by turning the bleed nMOSFET 234 on during a startup period of the dimmer system 2-100.

The control circuit 2-104 is configured to provide a bleed signal BLEED having the on signal during intervals wherein the gate signal GATE has an off value and provide a bleed signal BLEED having the off signal during intervals wherein the gate signal GATE has an on value. In an embodiment, the control circuit 2-104 is configured to only turn the driver nMOSFET 210 on while the bleed nMOSFET 234 is off, and only turn the bleed nMOSFET 234 on while the driver nMOSFET 210 is off.

Although the embodiment described above includes nMOSFETs, embodiments are not limited thereto. A person of skill in the art would understand that any of a variety of three-terminal electronic devices or circuits able to amplify and switch electrical signals could be used instead of the nMOSFETs described above, including p-channel MOSFETs, Junction Field-Effect Transistors (JFETs), bipolar junction transistors (BJTs), and combinations thereof.

Figure 3:
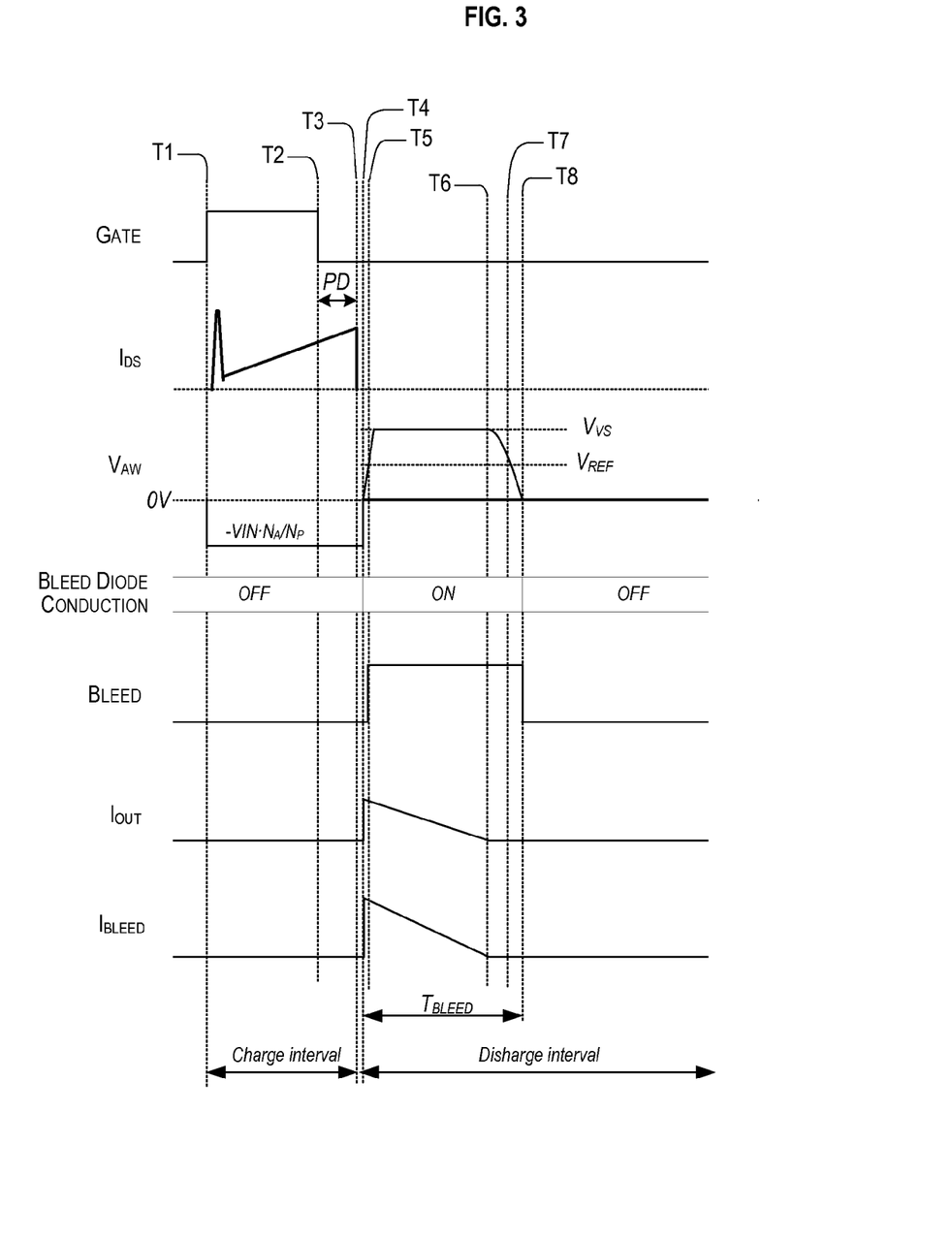
FIG. 3 is a waveform diagram illustrating an operation of the dimmer system of FIG. 2 according to an embodiment.

FIG. 3 is a waveform diagram illustrating an operation of the dimming system 2-100 of FIG. 2 according to an embodiment. In an embodiment, the operations illustrated in FIG. 3 occur during a startup period of the dimming system 2-100.

A person of skill in the art in light of the teachings and disclosures herein would recognize that the waveforms of FIG. 3 show one of a plurality of consecutive charge and discharge intervals of the dimming system 2-100. That is, the operation of the dimming system 2-100 includes a plurality of charge intervals and a plurality of discharge intervals interleaved with the plurality of charge intervals, such that a discharge interval occurs between each consecutive pair of charge intervals.

At a charge start time T1, the control circuit 2-104 provides a gate signal GATE having an on value to the driver nMOSFET 210. After a turn on delay time elapses after the charge start time T1, a drain-source current $I_{DS}$ flows through the driver nMOSFET 210, the primary winding 2-112 of the transformer 2-110, and the current sense resistor 218. The flow of the drain-source current $I_{DS}$ stores energy into the transformer 2-110.

While the drain-source current $I_{DS}$ flows through the primary winding 2-112, the magnetic coupling between primary and auxiliary windings 2-112 and 2-114 of the transformer 2-110 induces a value of the auxiliary winding voltage $V_{AW}$ according to a value of the input voltage VIN, a number of turns $N_A$ of the auxiliary winding 2-114, and a number of turns $N_P$ of the primary winding 2-112, as shown in Equation 2:

$$V_{AW} = -VIN \cdot \frac{N_A}{N_P}. \quad \text{(Equation 2)}$$

Because the induced value of the auxiliary winding voltage $V_{AW}$ is negative while the drain-source current $I_{DS}$ flows through the primary winding 2-112, the third diode 208 and the bleed diode 230 are reverse biased, and no current flows from the auxiliary winding 2-114 into the voltage supply circuit 2-102 or into the bleed circuit 2-106. When the auxiliary winding voltage $V_{AW}$ is negative, because no current flows from the auxiliary winding 2-114, no energy is discharged from the transformer 2-110.

At a charge stop time T2, the control circuit 2-104 provides a gate signal GATE having an off value to the driver nMOSFET 210. When a propagation delay time PD elapses after the charge stop time T2, the drain-source current $I_{DS}$ stops flowing through the driver nMOSFET 210 and the current sense resistor 218.

After the drain-source current $I_{DS}$ stops flowing through the driver nMOSFET 210, that is, after an end of the charge interval, at a discharge start time T3 the energy stored in the transformer 2-110 begins to discharge by generating a primary winding voltage drop $V_{PW}$ and the auxiliary winding voltage $V_{AW}$ across the primary and auxiliary windings 2-112 and 2-114, respectively. Respective values of the primary winding voltage drop $V_{PW}$ and the auxiliary winding voltage $V_{AW}$ are related according to Equation 3:

$$V_{AW} = -V_{PW} \cdot \frac{N_A}{N_P}. \quad \text{(Equation 3)}$$

The values of the primary winding voltage drop $V_{PW}$ and the auxiliary winding voltage $V_{AW}$ generated by the discharge of the energy stored in the transformer 2-110 have polarities opposite to their respective polarities when the drain-source current $I_{DS}$ was flowing. Therefore, when the energy stored in the transformer is being discharged, a voltage at the second terminal of the primary windings 2-112 is greater than a voltage at the first terminal of the primary windings 2-112, and the polarity of the value of the auxiliary winding voltage $V_{AW}$ is positive.

When the value of the primary winding voltage drop $V_{PW}$ exceeds a forward voltage drop of the second diode 214 and a voltage drop across the second capacitor 219 of the LED driver circuit 2-116, the output current $I_{OUT}$ flows through the second diode 214. If the voltage drop across the second capacitor 219 exceeds a forward voltage drop of the LED 2-120, some or all of the output current $I_{OUT}$ flows through LED 2-120 and the LED 2-120 produces light.

At a bleed start time T4, the control circuit 2-104 turns the bleed nMOSFET 230 on by producing a bleed signal BLEED having the on value. In an embodiment, the bleed start time T4 is determined by a delay function of the control circuit 2-104 according to the charge stop time T2 and a propagation delay time PD.

In another embodiment, the bleed start time T4 is determined according to a comparison of the auxiliary winding voltage $V_{AW}$ to a reference voltage $V_{REF}$. For example, the bleed start time T4 may occur when the auxiliary winding voltage $V_{AW}$ increases to a value greater than a value of a reference voltage $V_{REF}$, such as occurs at a first crossover time T5 shown in FIG. 3.

When the bleed nMOSFET 234 turns on, the bleed diode 230 conducts and the bleed current $I_{BLEED}$ flows from the auxiliary winding 2-114 through the bleed circuit 2-106. A value of the bleed current $I_{BLEED}$ is determined according to a value of the auxiliary winding voltage $V_{AW}$ and a resistance value of the bleed resistor 232.

When the discharge of the energy stored in the transformer 2-110 begins, the sum of the value the output current $I_{OUT}$ and the value of the bleed current $I_{BLEED}$ will equal the value of the source-drain current $I_{DS}$ at the time when the driver nMOSFET 210 was turned off Therefore, an increase in the value of the bleed current $I_{BLEED}$ will cause a decrease in the value of the output current $I_{OUT}$ and prevent an overshoot from occurring.

In an embodiment, the control circuit 2-104 continues to produce the bleed signal BLEED having the on value and the bleed nMOSFET 234 is turned on until, at the discharge stop time T6, the energy stored in the transformer 2-110 is substantially completely discharged.

At a bleed stop time T8, the control circuit 2-104 turns off the bleed nMOSFET 234 by producing the gate signal GATE having the off value. In an embodiment, the control circuit 2-104, using a timing function of the control circuit 2-104, determines the bleed stop time T8 according to the bleed start time T4 and a bleed duration $T_{BLEED}$. In another embodiment, the control circuit 2-104 determines the bleed stop time T8 according to the charge stop time T2, a propagation delay time PD, and the bleed duration $T_{BLEED}$. In another embodiment, the control circuit 2-104 determines the bleed stop time T8 according to a comparison of the value the auxiliary winding voltage $V_{AW}$ and the voltage reference $V_{REF}$, such as us shown at the second crossover time T7.

Figure 4:
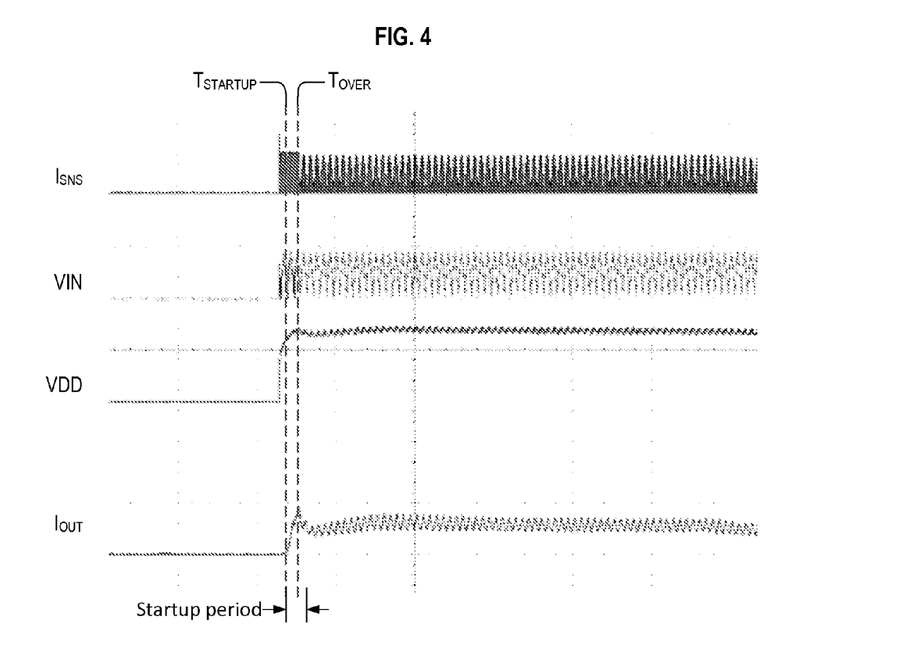
FIG. 4 shows waveforms illustrating an operation of a dimmer system.

FIG. 4 shows waveforms illustrating an operation of a dimmer system of the related art. FIG. 4 includes waveforms during a startup period of a current sense signal $I_{SNS}$, an input voltage VIN, and a supply voltage VDD, and an output current $I_{OUT}$.

At a startup time $T_{STARTUP}$ a supply voltage VDD reaches a value sufficient for operation and generation of an output current $I_{OUT}$ begins. At the overshoot time $T_{OVER}$, an overshoot surge occurs in the output current $I_{OUT}$.

Figure 5:
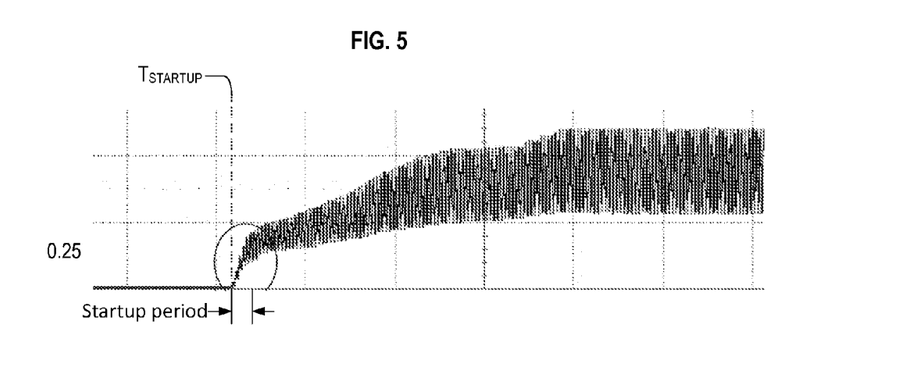
FIG. 5 shows waveforms illustrating an operation of a dimmer system according to an embodiment.

FIG. 5 shows waveforms illustrating an operation of a dimmer system according to an embodiment. FIG. 5 includes a waveform of an output current $I_{OUT}$ during a startup period. As can be seen in the circled region, no overshoot occurs in the output current $I_{OUT}$ during the startup period.

Figure 6:
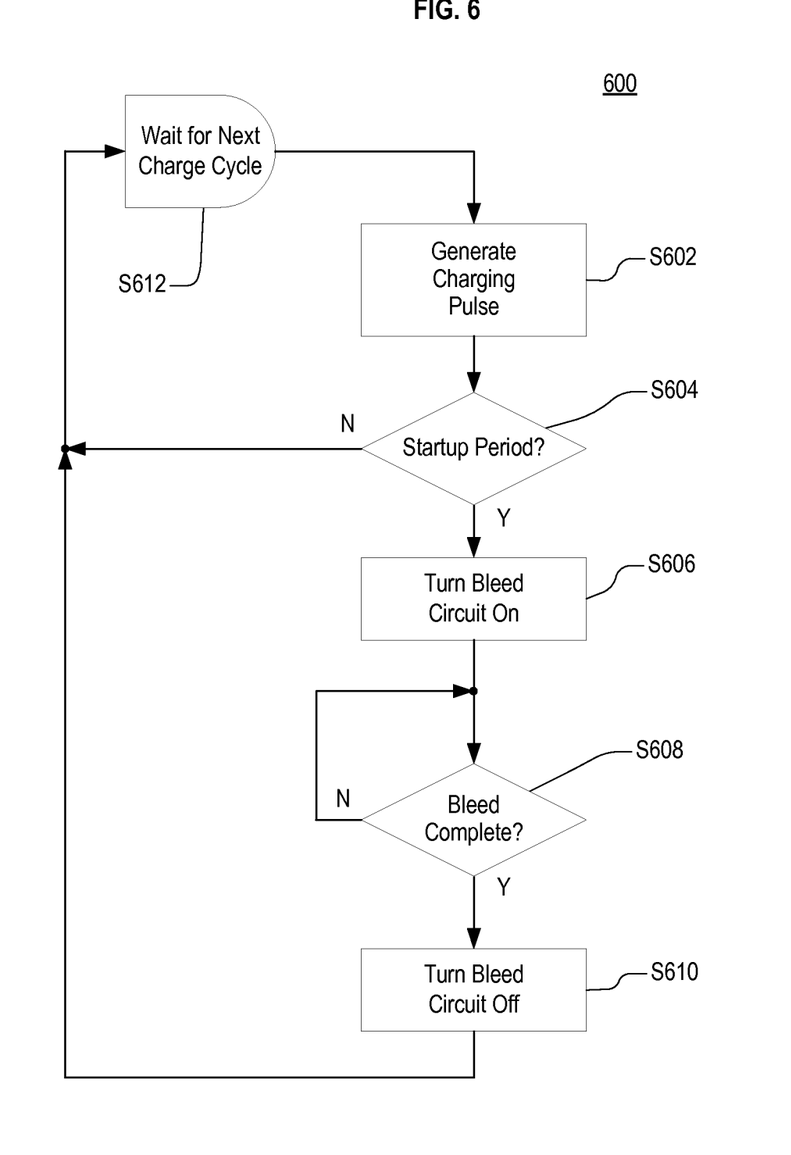
FIG. 6 is a flowchart of a process for preventing an overshoot according to an embodiment.

FIG. 6 is a flowchart of a process 600 for preventing overshoot during a startup period according to an embodiment.

At S602, an electronic system generates a charging pulse at the beginning of a charging cycle and provides the charging pulse to an energy storage device such as a transformer or an inductor. The charging pulse causes energy to be stored into the energy storage device and may be a pulse width modulated (PWM) pulse. When the charging pulse ends, the energy stored in the energy storage device begins to discharge.

At S604, whether the electronic system is in a startup period is determined. The startup period may be determined using one or more of a timer circuit, a timer function of a program executed on a processor of the electronic system, and a comparison of a supply voltage with a reference voltage.

When the electronic system is not in the startup period, the process 600 proceeds to S612 to wait for the beginning of the next charging cycle.

When the electronic system is in the startup period, the process 600 proceeds to S606 and a bleed circuit is turned on to begin a bleed operation. The bleed circuit is configured to receive energy discharged from the energy storage device.

In an embodiment, the bleed circuit is turned on immediately after the charging pulse ends. In another embodiment, the bleed circuit is turned on at a delayed time after the charging pulse ends. The interval between the end of the charging pulse and the turning on of the bleed circuit may include a propagation delay time. In another embodiment, the bleed circuit is turned on when a voltage associated with the discharge of the energy from the energy storage device reaches a threshold value.

At S608, the process 600 determines whether the bleed operation is complete. Whether the bleed operation is complete may be determined according to one or more of a time since the end of the previous charging pulse, a time since the start of the bleed operation, and a voltage associated with the discharge of the energy from the energy storage device.

When the bleed operation is complete, at S610 the bleed circuit is turned off and the process 600 proceeds to S612.

At S612, the process 600 waits until the next charge cycle begins. The frequency of charging cycles may be fixed, or pulse frequency modulation (PFM) may be used to vary the frequency of the charging cycles.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. An apparatus comprising:
   an energy storage device;
   a driver circuit configured to receive energy from the energy storage device; and a bleed circuit configured to reduce an amount of the energy received by the driver circuit from the energy storage device, wherein the driver circuit is configured to receive the energy from the storage device during a discharge interval, and wherein the bleed circuit is configured to reduce the amount of the energy received by the driver circuit during the discharge interval.

2. The apparatus of claim 1, wherein the bleed circuit is configured to reduce the amount of the energy received by the driver circuit during a startup period.

3. The apparatus of claim 1, wherein the apparatus is configured to store the energy into the energy storage device during a charge interval, and wherein the charge interval is disjoint from the discharge interval.

4. The apparatus of claim 3, wherein the apparatus is configured to receive a control signal and control a magnitude of the energy stored into the energy storage device according to the control signal.

5. The apparatus of claim 1, wherein the bleed circuit is configured to begin reducing the amount of the energy received by the driver circuit at a bleed start time determined according to a delay time from an end of the charge interval, a voltage produced by the energy stored in the energy storage device, or both.

6. The apparatus of claim 1, wherein the bleed circuit is configured to stop reducing the amount of the energy received by the driver circuit at a bleed stop time determined according to one or more of a duration from an end of the charge interval, a time from a bleed start time, and a voltage produced by the energy stored in the energy storage device.

7. The apparatus of claim 1, wherein the energy storage device includes a transformer, wherein the driver circuit is coupled to a primary winding of the transformer, and wherein the bleed circuit is coupled to an auxiliary winding of the transformer.

8. The apparatus of claim 7, wherein the bleed circuit is configured to reduce the amount of the energy received by the driver circuit by controlling a current of the auxiliary winding.

9. The apparatus of claim 7, further comprising a voltage supply circuit configured to provide a supply voltage and coupled to the auxiliary winding.

10. The apparatus of claim 1, wherein the apparatus is a dimming system.

11. The apparatus of claim 1, wherein the apparatus is provided in an integrated circuit.

12. A method comprising:

receiving, by a driver circuit, energy from an energy storage device;

reducing, using a bleed circuit, the energy received by the driver circuit during a startup period;

storing the energy into the energy storage device during a plurality of charge intervals;

receiving the energy from the energy storage device during a plurality of discharge intervals interleaved with the plurality of charge intervals; and reducing the energy received by the driver circuit during the plurality of discharge intervals during the startup period.

13. The method of claim 12, wherein the energy storage device is a transformer, wherein the driver circuit is coupled to a first winding of the transformer, and wherein the bleed circuit is coupled to a second winding of the transformer.

14. The method of claim 13, wherein reducing the energy received by the driver circuit includes controlling a current of the second winding of the transformer.

15. The method of claim 12, further comprising:

starting the reduction of the energy received by the driver circuit according to a delay time after a charge interval, a voltage of the energy storage device, or both.

16. The method of claim 15, further comprising:

stopping the reduction of the energy received by the driver circuit according to one or more of a duration from an end of the charge interval, a time of starting the reduction of the energy received by the driver circuit, and the voltage produced by the energy stored in the energy storage device.

17. The method of claim 12, further comprising:

receiving a control signal; and controlling a magnitude of the energy stored in the energy storage device according to the control signal.

* * * * *